July 1, 1941. J. B. FELDMAN 2,247,653
METHOD OF TESTING EYES
Filed Jan. 24, 1938    7 Sheets-Sheet 1
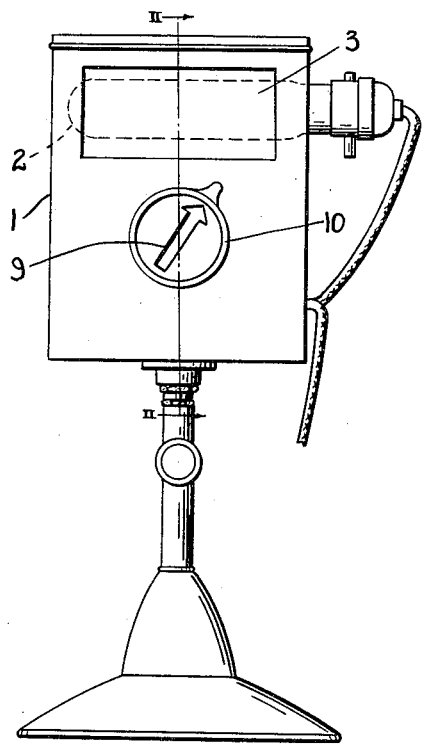
Fig. I
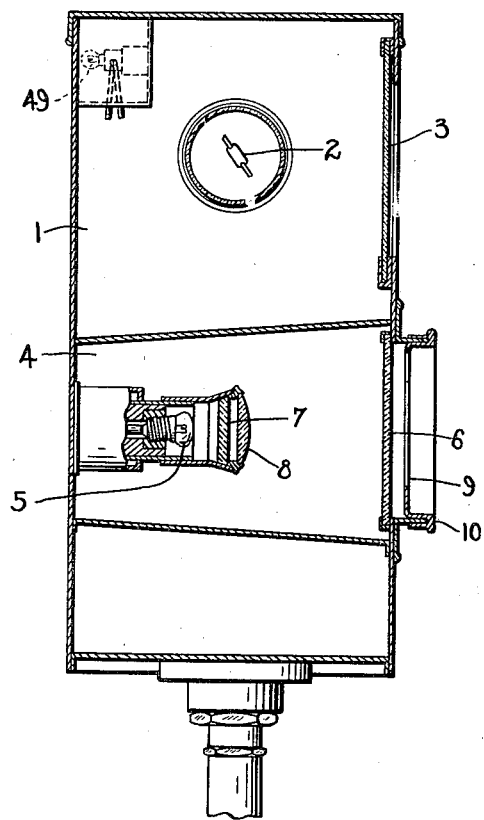
Fig. II
INVENTOR.
JACOB B. FELDMAN
BY Harry H. Styll
ATTORNEY.

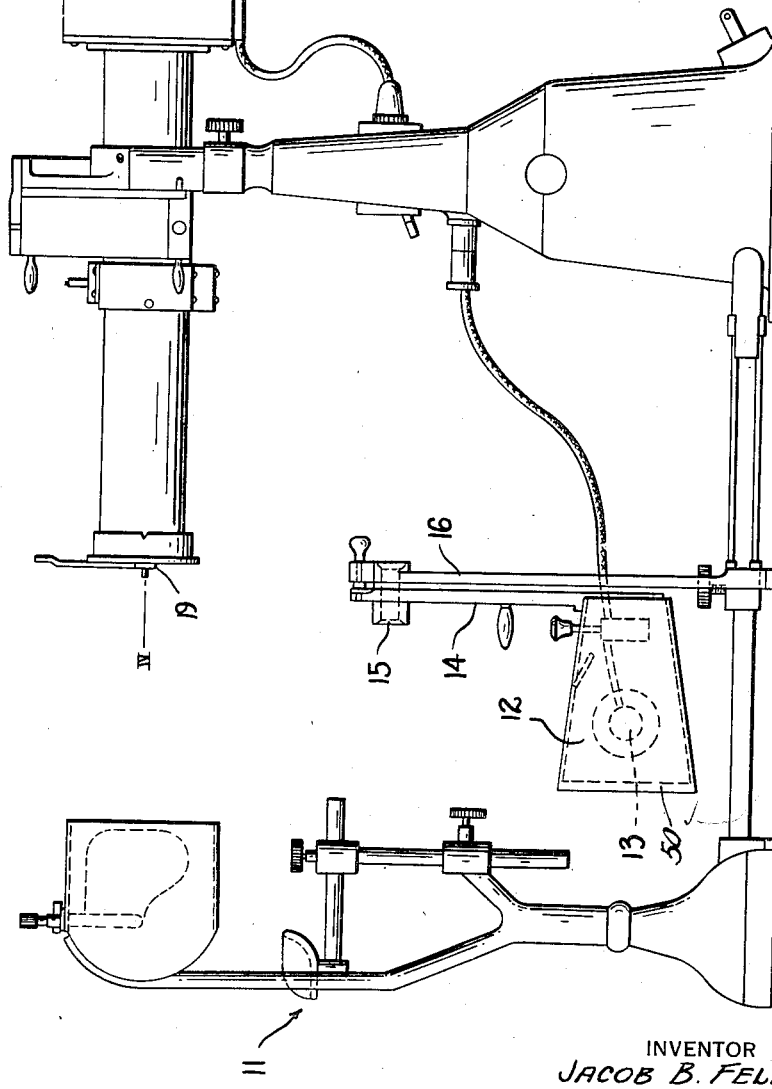

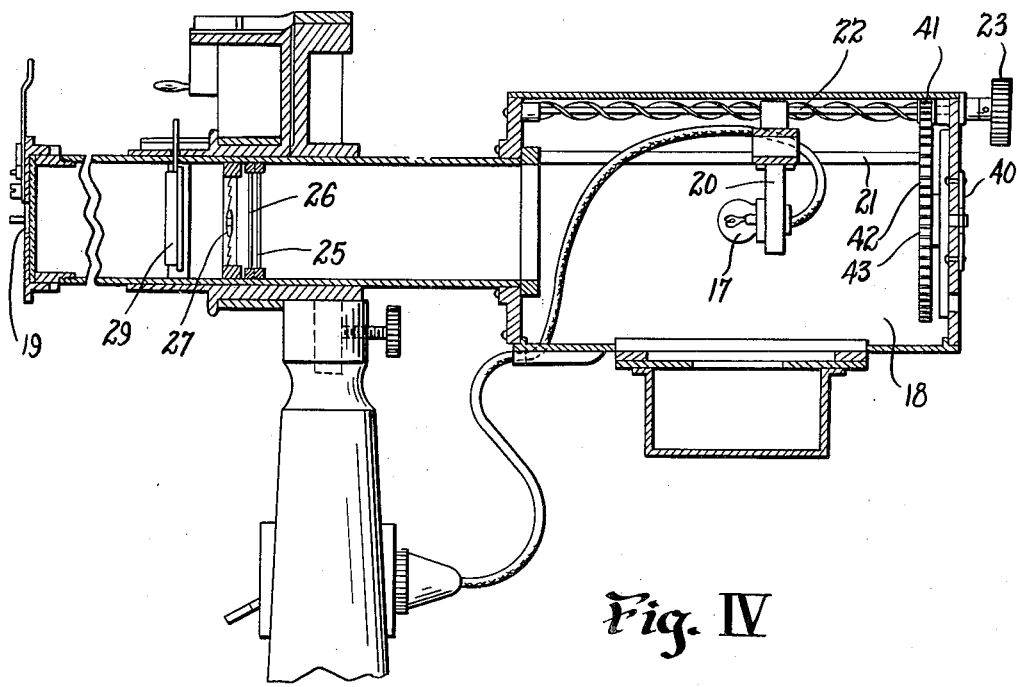

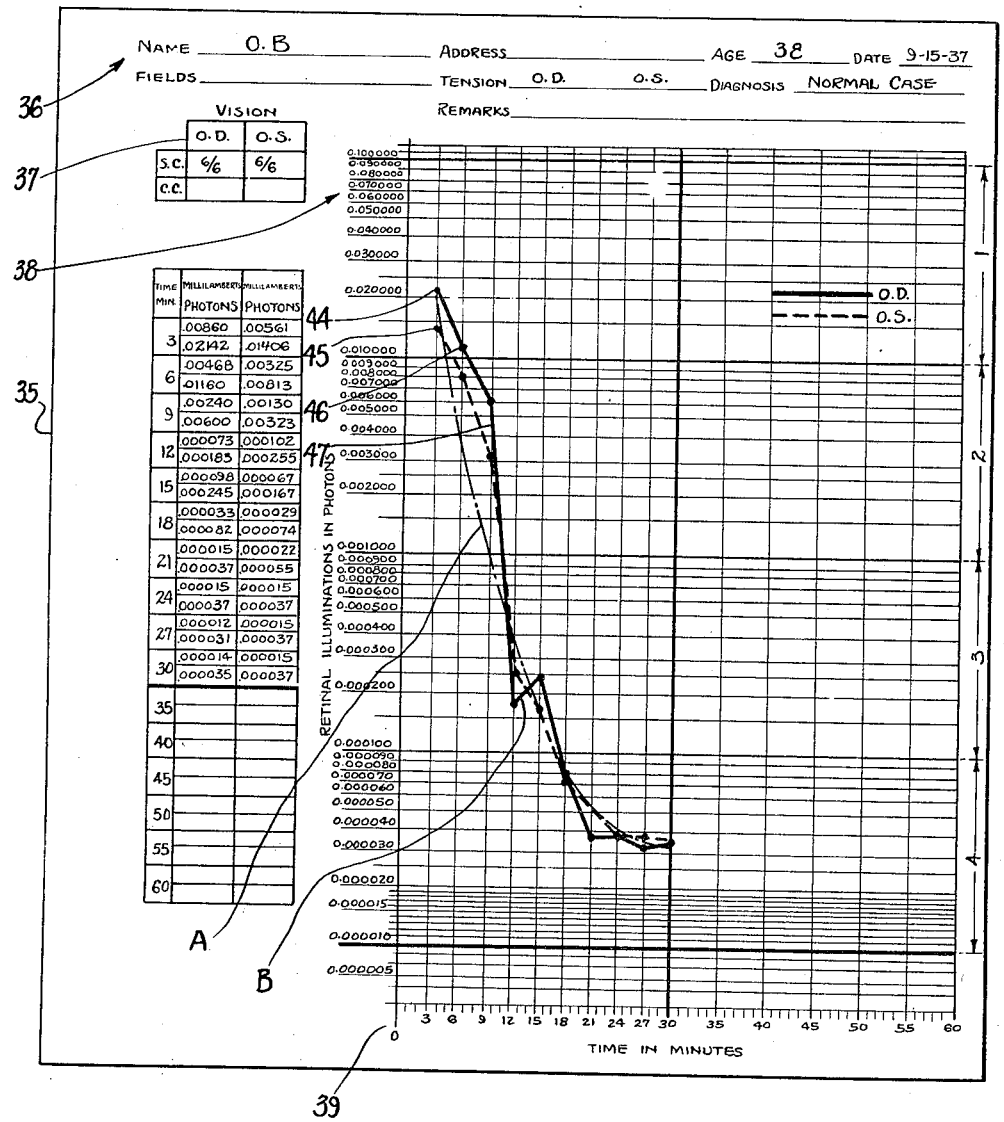
Fig. VIII

July 1, 1941.  J. B. FELDMAN  2,247,653
METHOD OF TESTING EYES
Filed Jan. 24, 1938  7 Sheets-Sheet 5
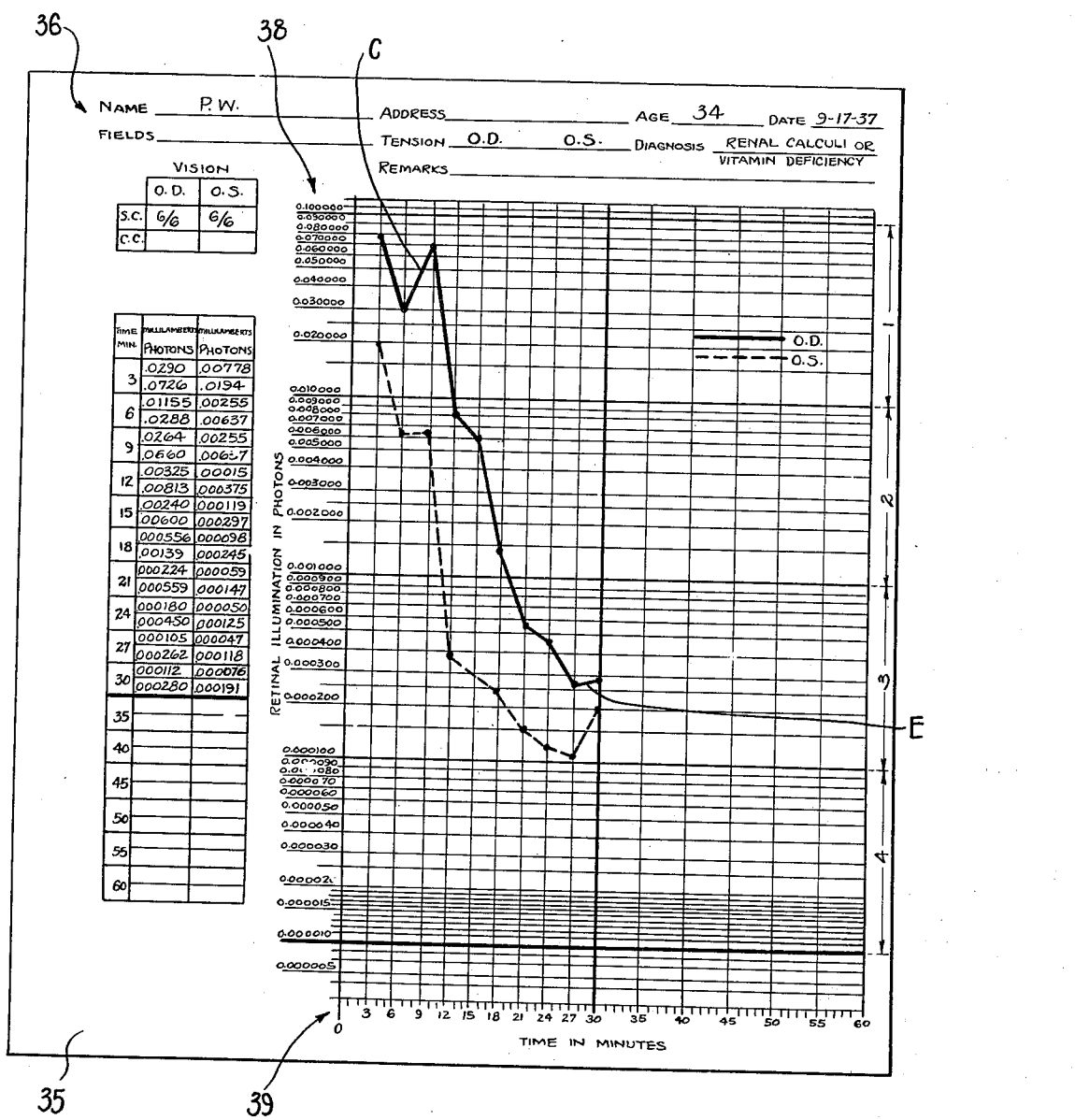
Fig. IX
INVENTOR.
JACOB B. FELDMAN
BY Harry H. Styll.
ATTORNEY.

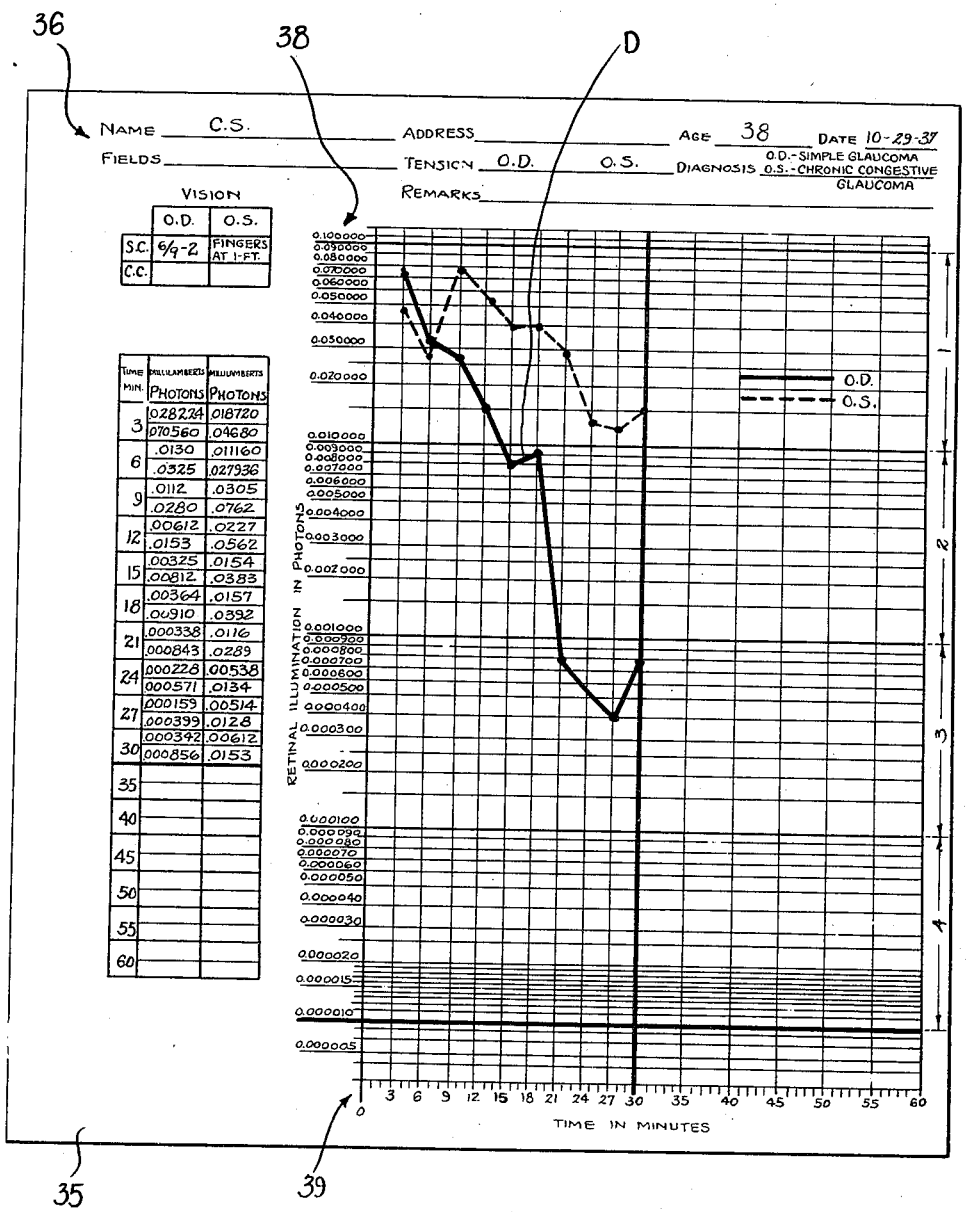
Fig. X

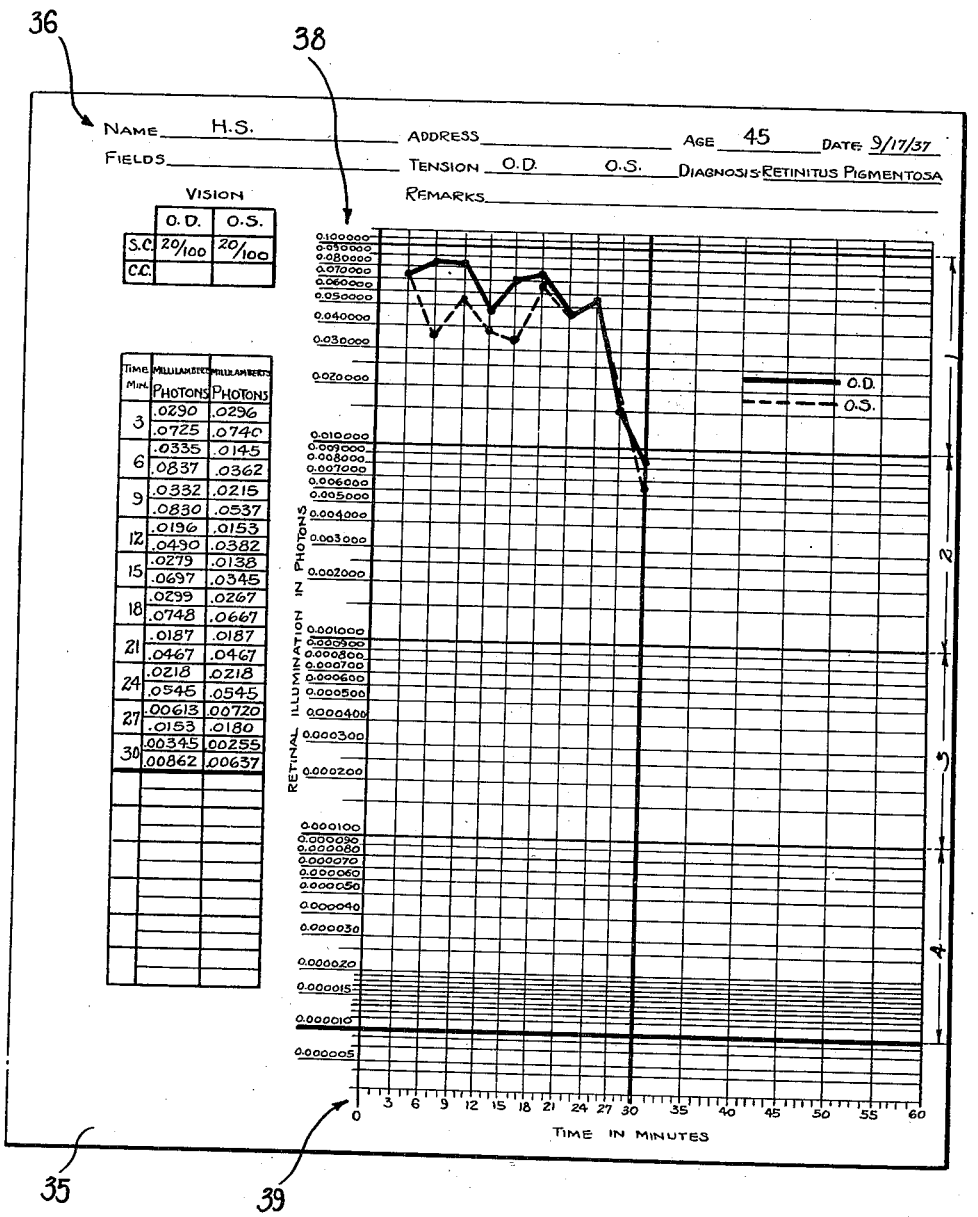
Fig. XI

Patented July 1, 1941

2,247,653

UNITED STATES PATENT OFFICE 2,247,653

METHOD OF TESTING EYES

Jacob B. Feldman, Philadelphia, Pa.

Application January 24, 1938, Serial No. 186,574

4 Claims. (Cl. 88—20)

This invention relates to an improved method or process for testing eyes to determine the dark adaptation thereof and associated pathological conditions.

This application is a continuation in part of my application for patent Serial No. 133,175 filed in the United States Patent Office on the 26th day of March, 1937, and my application for patent Serial No. 154,176 filed in the United States Patent Office on or about the 17th day of June, 1937.

A principal object of this invention is to provide an improved method or process for testing eyes to determine dark adaptation in a qualitative and quantitative manner and the determination of the existence and character of pathological conditions requiring treatment.

Another important object is to provide an improved method of testing the eyes of an individual for night blindness by exposing the eye under test to a source of high intensity light for a given period of time according to said intensity to substantially bleaching out the visual purple in the eye and then exposing a low intensity source of illumination after shutting off the high intensity light and then determining the time required by the eye to see the low intensity source of illumination by the recovery of the visual purple.

Another object is to provide a method of testing the eyes of an individual for night blindness comprising subjecting the eye under test to a bright light for a specified period of time, according to the intensity of the light, setting a low intensity observation device having formed character in a selected position, shutting off the bright light and noting the time required for the patient to observe said low intensity observation device and report its position from the time the bright light was shut off, and/or adjusting and noting the intensity of visibility of said observation device.

Another object is to provide an improved method or process of testing eyes to determine the dark adaptation of the eyes by the quantity of light discernible at spaced time intervals and ascertaining therefrom the existing pathological conditions of the patient.

Another object is to provide an improved method or process of testing eyes comprising charting the dark adaptation of a relatively large number of known pathological cases by quantity of light discernible at spaced time intervals, charting the dark adaptation of the patient under test in like manner, and comparing the patient's chart with a chart or charts of the known cases to ascertain the pathological condition of the patient.

Another object is to provide an improved method or process of testing eyes to determine the dark adaptation of a patient by means which prevent the patient from decerning the operator or himself as to the quantity of light discernible at given time intervals.

Other objects and advantages of the invention will become apparent from the following description taken in connection with the accompanying drawings and it will be apparent that many changes may be made in the details, arrangements and steps of the process shown and described without departing from the spirit of the invention as expressed in the accompanying claims. I, therefore, do not wish to be limited to such details, arrangements and steps of the process shown and described as the preferred forms and steps of the process have only been given by way of illustration.

Referring to the drawings:

Fig. I is a front elevation of one form of apparatus for determining dark adaptation qualitatively;

Fig. II is a cross section of Fig. I taken as on line II—II;

Fig. III is a side elevation of another form of apparatus for determining dark adaptation both qualitatively and quantitatively;

Fig. IV is a longitudinal cross section of Fig. III taken as on line IV—IV;

Fig. V is a front view of a color test disc usable with the device of Fig. III;

Fig. VI is a front view of a light diaphragm member usable with the device of Fig. III;

Fig. VII is a front view of a cup member employed for the purpose of controlling and varying the shape, position and extent of the visual field and is for use in the device of Fig. III; and, Figs. VIII, IX, X and XI are chart curves determined from quantities of light discernible at spaced time intervals and indicating different pathological conditions.

Referring to the drawings in which similar reference characters represent similar parts throughout:

The apparatus and the operations thereof are the same as set forth, disclosed and described in my two applications for patent referred to above, and which disclosures and descriptions are incorporated herein and made a part hereof.

The method or process described herein is based on the previous study of some thousands of actual pathological cases whose diseases or ailments have been actually medically determined. After each of these cases had been medically diagnosed, the patient was then subjected to a dark adaptation test as described hereafter, and as described in my two applications aforesaid by ascertaining the amount of light discernible at given spaced time intervals and a curve chart mapped out, showing graphically the characteristic curve for the given pathological condition of the patient. A graphic curve chart was made for each of the said patients of known pathological conditions. A study of these charts indicated that for each similar pathological condition the curve showed a similar characteristic at a certain position on the curve, as for example in cases of glaucoma, there is a characteristic offset at the very start of the curve. Various diseases each have their characteristic effect on the curve as shown by the large number of actual cases known and charted.

Among the various pathological conditions indicated on these charted curves of actual known cases are:

Vitamin A deficiency, sinus infection, glaucoma, arterial sclerosis, endocrini disturbance, stone in kidney, jaundice, liver troubles, dermatosis, certain blood diseases, post febrile conditions, grippe and colds, temporary illnesses, usually with rise of temperature, pregnancy after six months, etc.

These curves are particularly effective in indicating a deficiency in vitamin A, as there is no other effective reliable way known for determining this.

It is clear from the above that if the dark adaptation curve of a patient under test be taken and compared with the previously prepared case charts, the pathological condition of the patient may be determined from the characteristics of his curve chart.

The above is the procedure followed when a determination of pathological conditions is desired.

The process or method also is of the highest utility in determining whether a person has night blindness or not. This is of the highest importance to those who have to drive automobiles at night or are engaged in occupations requiring good vision at night. Authorities will probably require that applicants to drive will have to pass a night blindness test. As the license will depend on the result of the test many might be tempted to deceive the one making the test, by reporting what he knows he should report, rather than what he actually sees. In my invention I have provided means and procedures by which this is prevented. By using the apparatus described in my aforesaid applications the patient has not only to report the quantity of light seen, but its direction as well. As the directional means are shiftable the patient must report the direction he actually sees or he will be caught up with. In many cases, as is well known, a patient will report what he believes he sees or ought to report, rather than what he actually sees. This is a psychology that makes many forms of subjective eye testing so difficult. The directional means forces the patient to concentrate on what he actually sees and so report it. If he guesses he is caught up with. This provision of anti-cheating means is of great importance and is a novel feature of my invention.

In testing for night blindness qualitatively I preferably use the device of Figs. I and II which comprises a housing 1 having a light source 2 therein of a relatively high intensity and a light screen 3 through which the source of light 2 is viewed. The housing 1 is provided with a compartment 4 having a dim light source 5 therein and a light screen 6 through which the dim light source is to be viewed. A suitable daylight filter 7 and a fusing lens 8 are positioned between the dim light source 5 and screen 6. The dim light source 5 is discernible through an arrow slit 9 formed in a rotatable cap like member 10 which enables the arrow to be moved in different directions.

The above device is described in detail in my copending application Serial No. 133,175, filed March 26, 1937.

The test is performed by first turning on the bright light 2 and having the patient look at said light for a given period of time depending upon the intensity of said light 2.

This light source is preferably for the purpose of bleaching out the visual purple in the eye. During the viewing of said bright light the dimmer light 5 is turned on and the arrow 9 set in a desired direction. The bright light 2 is then turned off and the time it takes the patient to discern the dim light 5, which of course is of a predetermined controlled intensity, is noted and attention is also given to the reported direction at which the arrow is positioned. This varying of the position of the arrow provides an anti-cheater device so that the accuracy of the patient's statements may be checked.

If the patient discerns the light 5 and the direction of the light slit 9 in a determined time, say within five minutes, it is known from experience and experimentation that the patient has normal light adaptation. If his time is beyond this limit it is known the patient has night blindness and he is referred to further test as to quantity of light discernible at given time intervals, and a chart, such as shown in Figs. VIII to XI, inclusive, is made of his curve so as to ascertain his pathological condition as will be described more in detail hereinafter, or he may be referred to medical examination by qualified medical practitioners. Those that show normal dark adaptation may be passed or licensed to drive or perform other occupations requiring good night vision.

In cases where abnormal dark adaptation is indicated by the tests described above, or if desired to obtain a patient's pathological condition without previous qualitative test I test them by means of the apparatus shown in Figs. III and IV, which device permits of the measurement of the quantity of light discerned at spaced time intervals, and is also provided with an anti-cheating device. The apparatus in this instance is provided with a head rest 11 in which the patient whose eyes are to be tested is supported. The apparatus is provided with a casing 12 having a bright light source 13 therein. The bright light source and casing are carried by an arm 14 pivotally attached at 15 to a support 16 so that the said bright light may be swung into alignment with the patient's eyes under test. When in this aligned position the light 13 is turned on. The front of the casing 12 is provided with a suitable frosted or flashed glass screen 50 for diffusing the light. The bright light is exposed to the eye or eyes under test for a given length of time, for example three minutes or so, depending upon the intensity of the light and is then turned off and swung out of alignment with the eyes as shown in Fig.

III. Prior to turning off the high intensity light a dim light source 17, carried in a suitable housing 18, is turned on and a slit 19 similar to the arrow slit 9 is turned to the direction desired. The cap having the slit 19 therein is provided with a pivoted plate 24 which may be swung over the slit 19 as desired so that the light source 17 and the direction of slit can not be distinguished until the plate 24 is swung clear of the slit 19 as shown in Fig. VII. The dim light 17 is of a controlled intensity and is supported on a bracket 20 which is slidable on the slide rods 21 and which is engaged with a threaded shaft 22, rotation of which, causes said light 17 to be moved longitudinally of the housing 18. The threaded shaft 22 is adapted to be manually rotated by means of the thumb nut 23. The apparatus is also provided with a light diffusing plate 25, daylight filter 26 and iris diaphragm 27 which provide means for controlling and varying the quality and quantity of the light coming from the light source 17. The iris diaphragm 27 is provided with a suitable operating mechanism having scale means 28 for indicating the extent of opening of the iris.

A suitable filter 29 having different colored discs 30, 31, 32 and 33 of different wave lengths such as red, green, yellow, blue and so forth, such as shown in Figs. IV and V, may be used to test the response of the eyes to different colors or lights of different wave lengths. The colored disc may be selected by rotation of the member 29 to bring the discs into operative position in alignment with the opening 27.

After the dim light source 17 has been turned on and the associated parts of the apparatus such as the iris, slit 19, etc., have been properly adjusted, the bright light which is being exposed to the patient's eye or eyes is then turned off and swung out of alignment with the eyes as has been previously set forth above. After a given time interval, say three minutes, the thumb nut 23 is then manually rotated to move the light 17 forwardly, while the patient is asked to look in the direction of the slide 19, until the patient reports visibility of the light and the direction of the slit 19. The light 17 is then turned off for a given period of time, is then reilluminated and direction of slit changed without knowledge to the patient and light source 17 is then moved, as previously described above, until the patient again reports visibility of the light and the position of the slide 19. Several of such tests are made at spaced time intervals of three minutes throughout a period of from ½ to 1 hours' time.

The amount of light is obtainable by adjusting the iris diaphragm 27 until the patient reports where he sees it clearly and also by shifting the dim light 17 back and forth, as stated above. The movement of the diaphragm and the dim light 17 are noted on the scales 28 and 40 which indicate the size of light opening and the position of the light.

The readings for the time intervals and intensity of light seen at different intervals during the tests are indicated on suitable charts 35 such as shown in Figs. VIII to XI, inclusive.

These charts are provided with a suitable heading 36 having spaces wherein the name, address and age of the patient, date and so forth, may be recorded. A suitable outlined area 37 is provided wherein the visual acuity of each of the respective eyes may be recorded. The visual acuity, however, in this particular test, is not of great importance as will be shown hereinafter. The chart is provided with horizontal subdivisions associated with a suitable logarithmic brightness scale 38, see Fig. VIII, which indicates "Retinal illumination in photons." This chart also has vertical subdivisions associated with a scale 39 indicating "Time in minutes." Each vertical subdivision of the chart indicates a time span of three minutes.

Referring now more particularly to the device shown in Figs. III to VII inclusive, and to the charts illustrated in Figs. VIII to XI, inclusive, the testing and recording is carried out substantially as follows:

For ease in understanding, we will first consider a normal case, such as shown in the chart illustrated in Fig. VIII. In this chart, I have illustrated a theoretical hyperbolic curve A which would be the ideal increase in sensitivity of a normal eye.

The other curves shown in full dot and dash lines, although departing slightly from the ideal increase in sensitivity of a normal eye, indicate the actual recordings of a normal case.

The patient's head is properly positioned in the head rest 11, the housing 12 is moved into alignment with the patient's eye, say the right eye, to be tested. The light source 13 is turned on and the patient is asked to continually look at said light source for a definite period, say from three to five minutes, depending upon the intensity of the light, this time being preferably of such duration as to use up substantially all of the visual purple in the patient's eye. The position of the slit 19, opening in the iris 27, and so forth, are adjusted during the exposure of the high intensity light 13 and without knowledge to the patient. The light source 17 is then preferably turned on and adjusted to a position furthest away from the eye under test. The light source 13 is then turned off and swung out of alinement with the eye so that the member having the slit 19 therein is exposed to the direct vision of the eye. A period of three minutes is allowed to lapse and the source of illumination 17 is then adjusted toward the eye under test to a point at which the patient reports vision thereof and can distinguish the direction of the slit 19. The intensity of the light at its position of visibility is determined by the scales 28 and 40. The scale 40 is intergeared with the threaded shaft 22 by means of a train of gears 41, 42, and 43. The intensity for the three-minute interval is then indicated by placing a dot on the chart 35, as shown at 44. For ease of understanding, we have assumed that only the right eye at this time is being tested. The light source 17 is then blanked out, or by a suitable baffle plate or by closing the iris diaphragm 27, for another period of three minutes and a repetition of the above test is carried out until the intensity of the light visible at the end of six minutes is obtained. This recording is indicated at 46 in Fig. VIII. The light source 17 is then blanked out for another three minutes and the test is again carried out. Repetition of such tests are made and recorded over a period of thirty to sixty minutes as desired. In this particular instance, the test was carried out for a period of thirty minutes, at the end of which time it was found that the intensity level had been reached. A repetition of the above is made of the left eye, the recordings being indicated at 45.

It is to be understood that when the tests are being made with either of the above described apparatuses, such tests are conducted in a dark room or chamber. It is also to be understood that the amount of light at each exposure of the light source 17 may be controlled by the iris diaphragm 27. The movement of the diaphragm and the dim light 17 being noted on the scales 28 and 40, so that the examiner may obtain accurate readings at all times. After the readings have been recorded for each time interval, as indicated on the chart in Fig. VIII, a line such as indicated at 47, connecting the various points recorded on the charts, is drawn to obtain the chart curve. It will be noted that one ordinate of the chart indicates the amount of light and the other abscissal the time interval. The readings are indicated on the ordinate at each time interval and a curve is run through the indicated points on the ordinates. This gives the patient's dark adaptation curve. It will be noted that the curve terminates or that most of the activity in the dark adaptation curve took place in bracket 4 of the chart between 0.000010 and 0.000090 photon and that this is an indication of a normal case. If the threshold is in a bracket below 0.00010, the individual is considered normal.

The upturn illustrated at B in the chart of Fig. VIII denotes inattention on the part of the patient. When obtaining the various readings every three minutes for thirty minutes, as illustrated in the chart, no anti-cheater device is necessary. The continuous increase in sensitivity after each reading, as noted by a continuous curve, is in itself an anti-cheating device as various readings are taken and the continuous curve shows veracity on the part of the patient. The curves illustrated on the chart in Fig. VIII, therefore, show a normal case. Chart curves, similar to that shown in Fig. VIII, have been plotted of individuals having known pathological conditions. Some of these charts are indicated in Figs. IX to XI inclusive. The chart curve in Fig. IX indicates renal calculi or vitamin deficiency.

The chart illustrated in Fig. X indicates, for the right eye (O. D.) simple glaucoma, and for the left eye (O. S.) chronic congestive glaucoma.

The chart illustrated in Fig. XI shows the curve of a patient having retinitis pigmentosa.

Charts of individuals having other pathological cases, as previously mentioned above, and similar to those illustrated in Figs. IX to XI inclusive, have been made and recorded. When a patient comes in for examination, the curve of each of his eyes is plotted and his chart curves are thereafter compared with the recorded chart curves of the known pathological cases. The patient's pathological condition is determined from the characteristics of his chart curves which simulate the said recorded cases.

I have prepared my chart curves for cases of known pathological conditions from a study of years covering over three thousand actual cases wherein studies were made of the pathological conditions of each of the patients and then they were submitted to the dark adaptation tests described above and the chart curves of each plotted as described. From this collected data I have been enabled to determine the characteristics in the chart curves present under various pathological conditions, so it is only necessary now for me to plot the chart curve of a patient with unknown pathological conditions and by comparison with the chart curves of known cases determine from the chart curve of the last patient the pathological conditions indicated.

To facilitate ease in understanding the charts and as to how some of the pathological conditions are determined thereby, I have found that the normal case should have a light minimum at thirty minutes not more than .00010 photon or lying within the fourth bracket or below said bracket so that if the graph terminates in the fourth bracket, the individual can be considered normal.

If the graph terminates in the third bracket, between .000200 to .000800, I have considered cases between these as functional cases with the cause thereof being lack in vitamin A. This is illustrated in the chart of Fig. IX.

If the graph terminates or shows the greatest activity on the threshold between 0.000800 to 0.010000, I have considered such cases as pressure on the rods of visual purple interfering with their activity. This is noted in cases of arteriosclerosis, many cases of glaucoma, mild choroiditis, and others. This indicates night blindness due to local ocular pathology. When the threshold is above 0.01, where most of the activity in dark adaptation curve takes place in bracket 1, see Fig. XI, there is destruction in varying degrees of the rods for visual purple. This denotes incurable destruction of photosensitive apparatus. These cases are hopeless of cure. Therefore, I feel from this graph I can make a prognosis of the condition as well as diagnose; just from the graph, whether the patient has a functional condition, such as vitamin deficiency, beginning pressure in the eye, such as glaucoma, destruction of the rod, such as a retinitis pigmentosa or allied conditions.

When both eyes show a lack, this indicates that the condition is general. When one eye only is deficient and the other is normal, this indicates a local ocular condition.

The above is for the purpose of explaining how the charts are selected to evaluate them in their place of the pathology of dark adaptation.

In cases where the graph terminates in the lower brackets, for example brackets 3 or 4, and where the graph rises as illustrated at C in Fig. IX, or at B in Fig. VIII, or at D in Fig. X, this denotes inattention. If, however, the rise or upturn takes place after the curve reaches its lowest point from 27 to 30 minutes as illustrated at E in Figure IX, it is not normal and is not due to inattention; first, because the last reading lies within the third grouping; second, because from past experience, it has often been noticed that there is fatigue in many cases which have been examined, who had a vitamin A deficiency, and particularly in cases of individuals having kidney stones, where a vitamin deficiency is supposed to be present. The upturn at nine minutes, as illustrated at C, was too early for fatigue and, therefore, denotes inattention. The check of the veracity of the patient in this particular instance is not by the position of the stimulus or anti-cheater, but from decreasings in sensitivity in the succeeding readings. The upturn at 9 minutes, as illustrated at C, is different, due to inattention, because the succeeding readings at 12 minutes follow what would be a normal curve for the individual case.

The efficiency of the visual purple depends upon this vitamin A content and it, therefore, would be very easy to understand whether there was not insufficient vitamin in the visual purple of the eye, and a prolonged study of about thirty minutes would, naturally, cause fatigue and, therefore, show a lack of sensitivity.

The significance of comparing the right eye with the left, is that where one eye shows distinct pathology and the other eye shows a graph nearer to normal, one can make a diagnosis from the graph that the case which showed a definite pathological graph, will show definite pathology when an ophthalmoscopic examination is made of the retina. In other words, both curves for the right and left eye run almost parallel, but if they do not, there is definite indication of retinal pathology.

Cases terminating in the second bracket, between 0.00100 and 0.00900, are considered to belong to the arterior-sclerosis group and severe glaucoma.

The size and position of the target and the fixation of the patient can be arranged so that any specific area of the retina can be investigated. The fixation is determined by the directed finger position of the patient, who by means of his kinesthetic sense, can fixate his invisible finger. This is to shift the investigation to various areas and is accomplished by the examiner moving the hand of the patient so as to position his finger in different directions and by asking the patient to look in the direction at which his finger is positioned.

Cases within the threshold between 0.000100 and 0.000200 are questionable and might be considered as questionable normal cases.

The above is set forth only by way of illustration as to how the charts are considered and used in determining different pathological conditions.

In the use of the apparatus described for making the dark adaptation tests, I have so arranged the apparatus that the one making the test can look into the patient's eyes at all times, and hence observe if the eyes are closed at any time and the direction in which they are looking. It is important that the patient should not close his eyes as such suppression will cause a break in the chart curve. The patient is instructed to indicate by his hand when he first sees the second light, and is asked the direction of the light indicator.

A novel feature of my invention is the use of two lights, the bright light first, and then the secondary light. The apparatus may be so arranged that when the bright light is shut off, the secondary light is automatically turned on. A red tell-tale light 49, Fig. II, not visible to the patient, is arranged to indicate whether or not the secondary light is on or off.

In making the test for dark adaptation no medication, drops or other medical treatment is necessary. The complete test may be made with the apparatus described without other preparation of the patient. The tests are made in the dark.

From the data collected from the said actual known cases recorded, I have obtained a reliable knowledge of the kinds of ailments that have characteristic features on the chart curve and which do not effect the nature of the said curve, as for example, I have found that syphilis and gonorrhea have no characteristic effect on the said chart curve, while the ailments listed above do have a characteristic effect thereon.

I have also found in my work with thousands of cases that the intelligence of the patient is not a factor in the tests, whether the patient be a college graduate or uneducated.

Various forms of filters, lamps, optical systems and apparatus may be used to carry out my method of process. The method is not dependent on any particular form of apparatus or fittings, although I have found the forms described in my pending applications, mentioned above, to be very efficacious and accurate to obtain the required results, but the method is not dependent on any particular form of apparatus or mechanism.

Other tests, if desired, may also be made with the apparatus, as for example, a color test by using the device shown in Fig. V, Many various kinds of eye tests may be made, if desired, in conjunction with the dark adaptation test by utilizing known methods and apparatus.

Various time exposures and intervals may also be used, but I have found, from experience, that a three-minute exposure to the bright light gives good results, that if the secondary light is discerned in five minutes after the bright light is turned off, the patient has normal dark adaptation, and if over that time, he has abnormal dark adaptation. I have found three-minute intervals for thirty minutes for taking the chart measurements to give splendid results.

As all the apparatus used and their operation is disclosed in my said pending applications, I have not repeated those descriptions in detail here, but have largely confined myself to the description and explanation of the various steps and procedures of my methods and processes utilized to obtain the required results.

The apparatus shown and described in connection with Figs. I and II, is adapted particularly for dark adaptation tests, while the apparatus and charts shown in Figs. III to XI inclusive, are adapted particularly for the obtaining of the dark adaptation as well as the pathological condition of the patient. The apparatus shown and described in connection with Figs. I and II, the bright source of illumination, is first exposed to the patient's eyes under test, and the dim light source is turned on and the bright light source turned off, and the time interval is determined from the time at which the bright light is turned off and the patient reports visibility of the dim light and the direction of the arrow 9.

This provides very efficient anti-cheating means for testing the eyes for night blindness.

The apparatus shown and described in Figs. III to VIII inclusive, will also provide the above tests and, in conjunction therewith, provides simple and efficient means for determining the pathological condition of the patient. This, of course, involves the use of a plurality of recorded charts of the curves of individuals having given pathological defects. These standardized recorded charts, as previously stated above, were made from the findings of thousands of different known cases and these recorded charts are used in conjunction with the apparatus to carry out the steps of the method or process.

From the foregoing, it is clear that I have invented novel and useful methods or processes for carrying out and obtaining all of the objects and advantages of the invention, in a simple, direct and inexpensive manner, and in a way to avoid error and to insure accuracy of test and findings.

Having described my invention, I claim:

1. The method of examining an individual for pathological conditions including the steps of exposing the eyes of said individual to a source of illumination of a controlled given relatively high intensity for a given period of time sufficient to use up a substantial portion of the visual purple of the eyes and for a duration to establish a substantially stable physiological state, shutting off said relatively high source of illumination, waiting a given spaced time interval, exposing at the end of said given time interval a normally very low intensity source of illumination within the field of vision of the eyes and initially increasing the intensity of said relatively low source of illumination until an intensity is reached wherein the individual reports vission of said low intensity source of illumination, reducing said low intensity source of illumination below the threshold of vision for a given period of time substantially equal to the first time interval, observing the initial time lapse and the particular intensity required in order to render said low intensity source of illumination initially visible to the eyes of the individual, again waiting a given period of time substantially equal to the first time interval and again increasing the low intensity source of illumination at the lapse of said given time interval with said low intensity source of illumination being first reduced below the threshold of vision and then increasing the intensity of said source of illumination until the individual again reports visibility thereof, observing the time lapse for the particular intensity required in order to render said low intensity source of illumination visible for the second exposure and repeating said substantially equal time lapses and exposures until the threshold of vision becomes constant, plotting a dark adaptation graph from observations of the time-light study and comparing same with standard graphs prepared from similar tests of known pathological patients to determine the presence of a pathological condition in the individual as indicated by the similarity of the individual's graph with that of a patient having a known pathological condition.

2. The method of examining an individual for pathological conditions including the steps of exposing an eye of said individual to a source of illumination of a controlled given relatively high intensity for a given period of time sufficient to use up a substantial portion of the visual purple of the eye and for a duration to establish a substantially stable physiological state, shutting off said relatively high source of illumination, waiting a given spaced time interval, exposing at the end of said given time interval a normally very low intensity source of illumination within the field of vision of the eye and initially increasing the intensity of said relatively low source of illumination until an intensity is reached wherein the individual reports vision of said low intensity source of illumination, reducing said low intensity source of illumination below the threshold of vision for a given period of time substantially equal to the first time interval, observing the initial time lapse and the particular intensity required in order to render said low intensity source of illumination initially visible to the eye of the individual, again waiting a given period of time substantially equal to the first time interval and again increasing the low intensity source of illumination at the lapse of said given time interval with said low intensity source of illumination being first reduced below the threshold of vision and then increasing the intensity of said source of illumi-nation until the individual again reports visibility thereof, observing the time lapse for the particular intensity required in order to render said low intensity source of illumination visible for the second exposure and repeating said substantially equal time lapses and exposures until the threshold of vision becomes constant, plotting a dark adaptation graph from observation of said time study, repeating the same procedure for the other eye, plotting a dark adaptation graph from observations of the time studies of said eye and comparing the resultant graph with standard graphs prepared from similar tests of known pathological patients to determine the presence of a pathological condition in the individual as indicated by noting the similarity of the individual's graph with that of a patient having a known pathological condition.

3. The method of examining an individual for pathological conditions including the steps of exposing the eyes of said individual to a source of illumination of a controlled given relatively high intensity for a given period of time sufficient to use up a substantial portion of the visual purple of the eyes and for a duration to establish a substantially stable physiological state, shutting off said relatively high source of illumination, waiting a given spaced time interval, exposing at the end of said given time interval a normally very low intensity source of illumination within the field of vision of the eyes and initially increasing the intensity of said relatively low source of illumination until an intensity is reached wherein the individual reports vision of said low intensity source of illumination, reducing said low intensity source of illumination below the threshold of vision for a given period of time substantially equal to the first time interval, observing the initial time lapse and the particular intensity required in order to render said low intensity source of illumination initially visible to the eyes of the individual, again waiting a given period of time substantially equal to the first time interval and again increasing the low intensity source of illumination at the lapse of said given time interval with said low intensity source of illumination being first reduced below the threshold of vision and then increasing the intensity of said source of illumination until the individual again reports visibility thereof, observing the time lapse for the particular intensity required in order to render said low intensity source of illumination visible for the second exposure and repeating said substantially equal time lapses and exposures until the threshold of vision becomes constant, plotting a graph of the time-light observations and comparing same with an average graph plotted from tests of known pathological patients and observing the similarity between the average graph of known pathological conditions and the graph resulting from the examination, to indicate the presence of a pathological condition which is interfering with the proper assimilation of vitamin A in the body.

4. The method of examining an individual for pathological conditions including the steps of exposing an eye of said individual to a source of illumination of a controlled given relatively high intensity for a given period of time sufficient to use up a substantial portion of the visual purple of the eye and for a duration to establish a substantially stable physiological state, shutting off said relatively high source of illumination, waiting a given spaced time interval, exposing at the end of said given time interval a normally very low intensity source of illumination within the field of vision of the eye and initially increasing the intensity of said relatively low source of illumination until an intensity is reached wherein the individual reports vision of said low intensity source of illumination, reducing said low intensity source of illumination below the threshold of vision for a given period of time substantially equal to the first time interval, observing the initial time lapse and the particular intensity required in order to render said low intensity source of illumination visible to the eye of the individual, again waiting a given period of time substantially equal to the first time interval and again increasing the low intensity source of illumination at the lapse of said given time interval with said low intensity source of illumination being first reduced below the threshold of vision and then increasing the intensity of said source of illumination until the individual again reports visibility thereof, observing the time lapse for the particular intensity required in order to render said low intensity source of illumination visible for the second exposure and repeating said substantially equal time lapses and exposures until the threshold of vision becomes constant, plotting a time-light graph from observation of said time study, repeating the same procedure for the other eye, plotting a graph from observations of the time-light studies of said other eye and comparing same with an average graph plotted from similar tests of known pathological patients and observing the similarity between the average graph of known pathological conditions and the graph resulting from the examination, to indicate the presence of a pathological condition which is interfering with the proper assimilation of vitamin A in the body.

JACOB B. FELDMAN.